Dec. 16, 1930.  J. POWELL  1,785,647
CORN HARVESTING MACHINE
Filed March 27, 1925  4 Sheets-Sheet 1
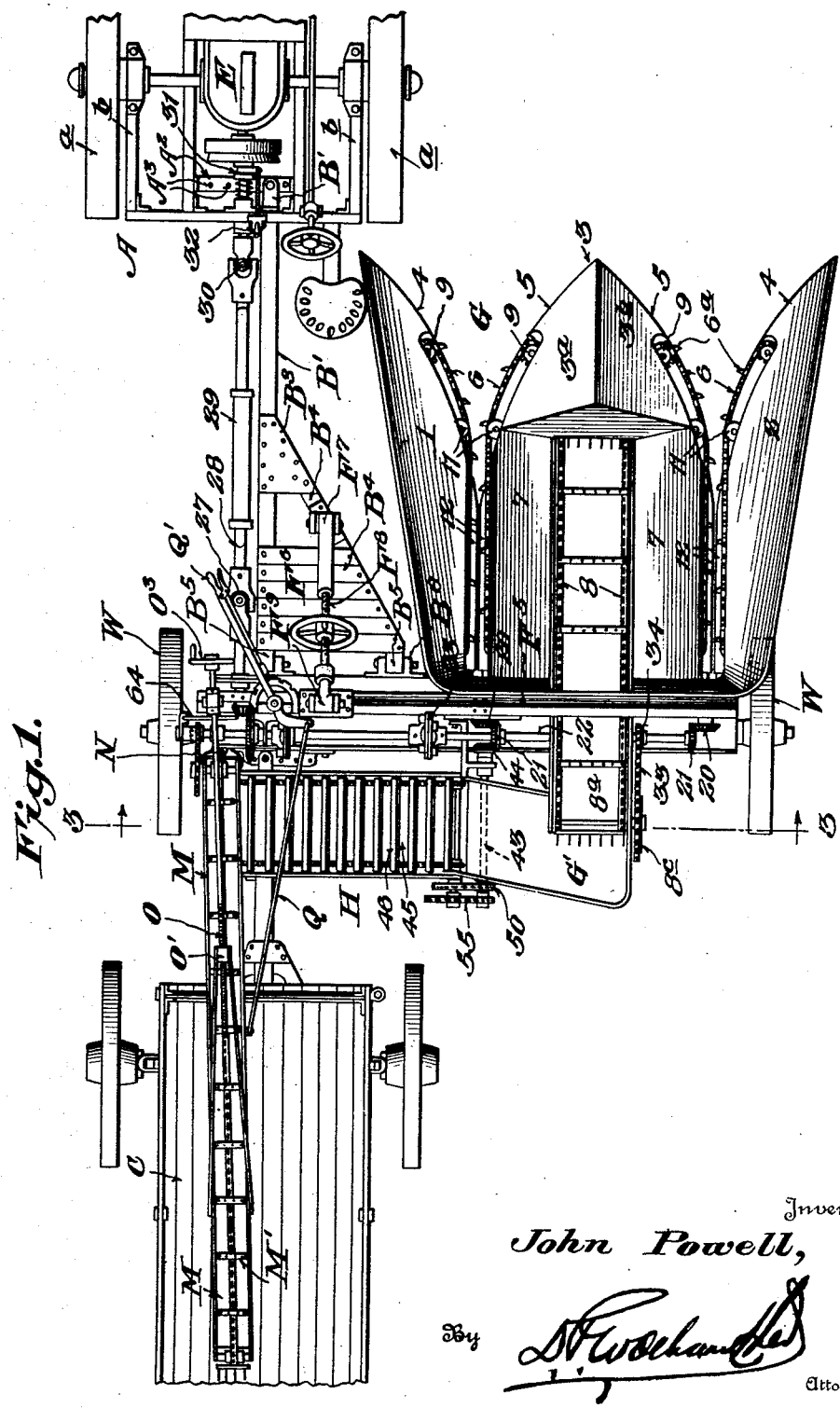
Inventor
John Powell,
By
Attorney

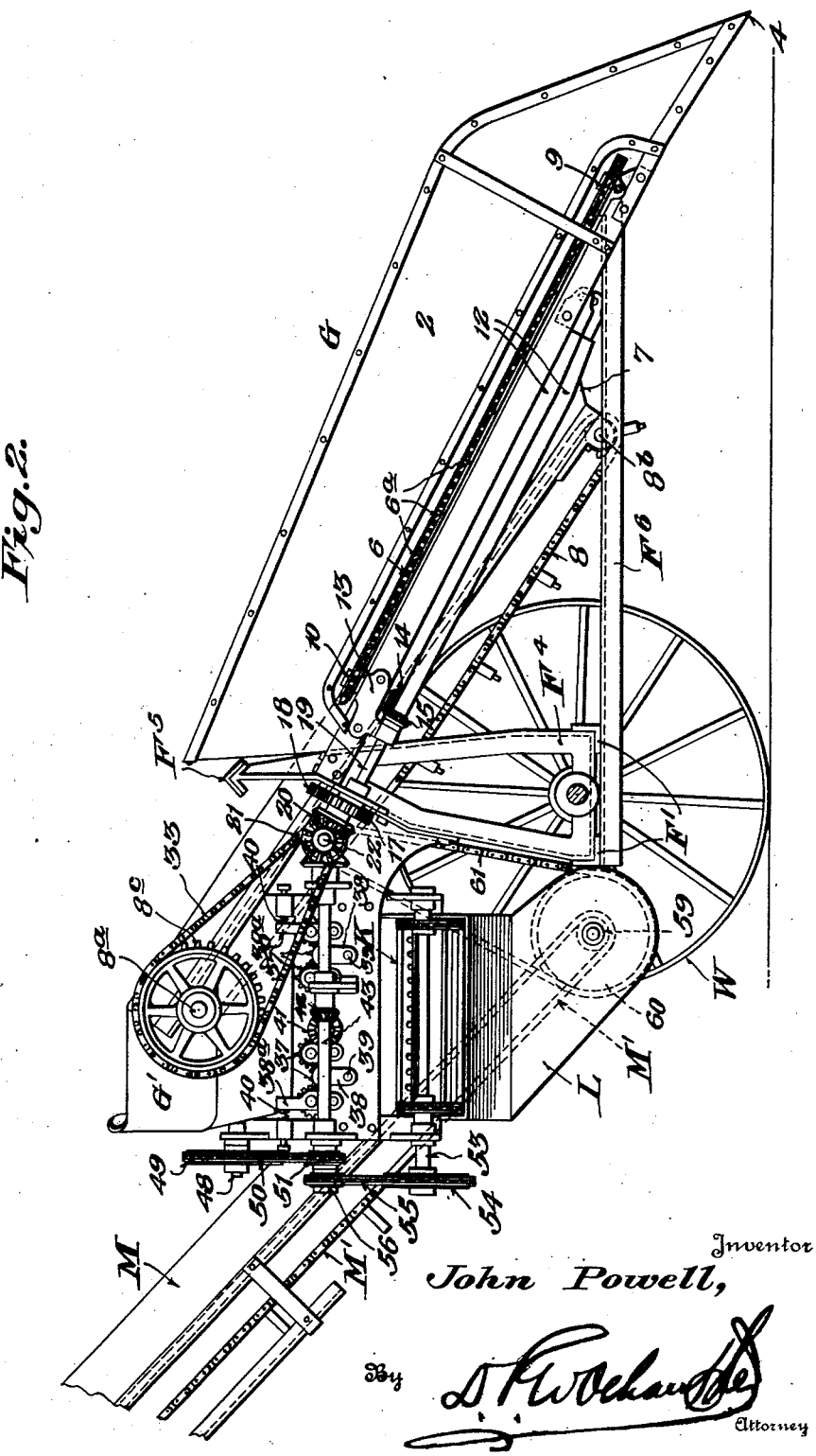

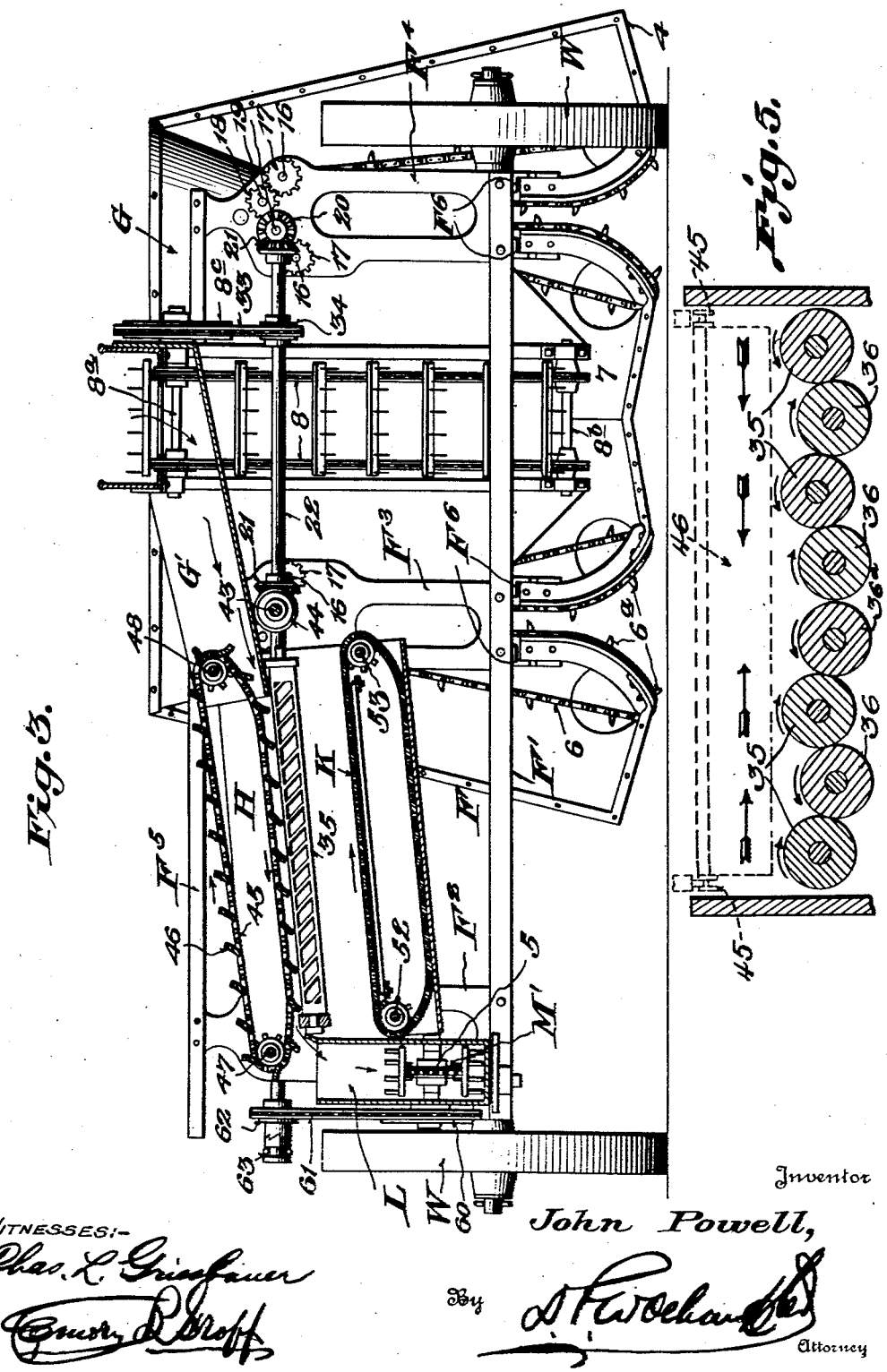

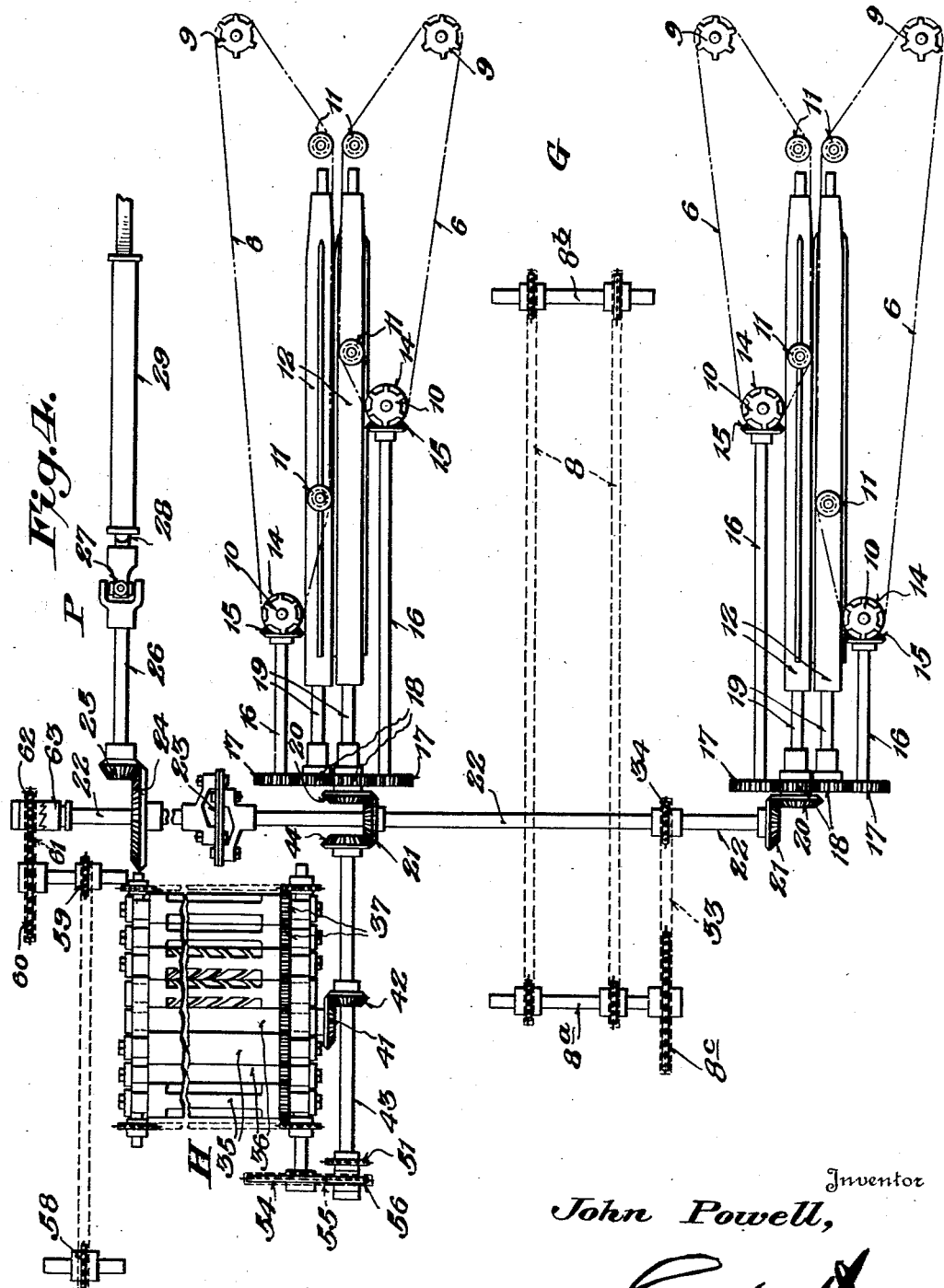

Patented Dec. 16, 1930

1,785,647

UNITED STATES PATENT OFFICE

JOHN POWELL, OF KOKOMO, INDIANA

CORN-HARVESTING MACHINE

Application filed March 27, 1925. Serial No. 18,718.

This invention relates to harvesting apparatus, and more particularly to a corn harvesting machine adapted to strip the ears of corn from two adjacent rows of corn simultaneously.

To that end the invention contemplates a machine that may be drawn through the corn field by a tractor or other motive power, thereby to remove the ears of corn from the stalks and thereafter remove the shucks from the ears preliminary to depositing the same in a trailing vehicle of a harvester train of which the latter is a part. In that connection, the invention contemplates a machine which will greatly facilitate the harvesting operation by handling ears of corn from two adjacent rows at once while at the same time depositing the shucked ears in a field transport vehicle which may be readily removed from the train after it is filled and permit of the attachment of another vehicle to continue trailing the harvester to receive the additional corn.

One of the objects of the invention is to provide an apparatus of the character set forth wherein the various instrumentalities are positively driven by the tractor or pulling vehicle without depending upon the movement of the harvester itself for any of the motive power. That is to say, it is proposed to provide a harvester wherein the harvesting mechanism is actuated directly by the motor of the tractor through suitable connections provided for that purpose thus avoiding any possibility of the clogging or jamming of the harvester mechanism due to miring of the harvester wheels in soft ground as might happen if the said mechanism were driven by said wheels and they slipped due to lack of traction when travelling over soft or slippery ground.

Another object of the invention is to provide a construction wherein the trailing vehicle to be loaded may be attached directly to the harvester beneath a suitable conveyor on the harvester, the point of attachment being in line with the draw-bar connection between the harvester and the tractor thereby evenly distributing the pulling load on the tractor and insuring proper travel of the trailer.

Also, the harvester may be readily detached from the tractor by simply removing a coupling pin and then disconnecting the motor drive for the harvesting instrumentalities.

A further object of the invention is to provide novel means for operating the several units of the harvester in proper synchronism from a common drive shaft which receives the power direct from the motor of the tractor.

A still further object of the invention is to provide a novel husking unit.

With the above and other objects in view which will more readily appear as the nature of the invention is better understood, the same consists in the novel construction, combination and arrangement of parts hereinafter more fully described, illustrated and claimed.

A preferred and practical embodiment of the invention is shown in the accompanying drawings, wherein:—

Figure 1 is a plan view illustrating the application of the invention.

Figure 2 is a side elevation of the harvester.

Figure 3 is a vertical sectional view taken on the line 3—3 of Figure 1.

Figure 4 is a diagrammatic view illustrating the arrangement and location of the shafting and gearing for operating the several units of the harvester.

Figure 5 is a cross-sectional view illustrating more clearly the manner in which the husking rolls rotate.

Similar reference characters designate corresponding parts throughout the several figures of the drawings.

As previously indicated the present invention contemplates a harvester, not only having the capacity for operating on more than one row of corn stalks at once, but also especially constructed to be used in connection with a pulling tractor and a trailing vehicle which removes the shucked corn from the field. To that end the invention contemplates special features of construction and design which render the operation of the harvester efficient under all conditions of use, and facilitate its manipulation.

As will be observed from Figure 1 the motive element or tractor is designated as A while the harvester, whose novel features of construction constitute the subject matter of the present invention is designated generally as B and the vehicle to be loaded with the shucked corn is designated by the reference character C. In connection with the tractor A it will be observed that the same includes the traction wheels $a$ mounted upon a frame $b$ and a suitable motor M which furnishes the power for driving the tractor and also pulling the harvester B which is coupled to the tractor by means of the draw-bar B'. As will be observed from Figure 1, the front end of the draw-bar may be connected with the cross-bar $A^2$ on the tractor at any one of a number of points in the length of the bar indicated by the openings $A^3$. This adjustment makes it possible to set the harvester B in the desired offset relation to the tractor, according to the spacing of the rows of corn, or other conditions under which it is desirable to operate in the field.

Attached to the draw-bar B' is an obliquely disposed bar or beam $B^2$ which is connected to the draw bar at its front end by a gusset plate $B^3$ and also supports a platform $B^4$. The rear end of the draw-bar $B^1$ and the obliquely disposed member $B^2$ are preferably provided with the knuckle portions $B^5$ for receiving the hinge pins of the hinge members $B^6$ carried by a main harvester frame designated generally as F. This frame includes in its organization the main cross frame members F' which support the upstanding end frame members $F^2$ and $F^4$ and the intermediate upstanding frame member $F^3$. The tops of the upstanding frame members $F^2$, $F^3$ and $F^4$ are connected at their upper ends by the transverse top rail $F^5$ which is preferably an angle member as shown in the drawings, thereby to rigidly connect the upper ends of the upstanding frame members and provide a rigidly braced structural frame. As will be observed from Figs. 2 and 3, the said main frame F constructed as above outlined is also provided with suitable axles for carrying the wheels W upon which the harvester proper travels. The bottom faces of the angle members F' have forwardly extending braces $F^6$ secured thereto for the purpose of supporting the gathering and picking units G. The lower ends of these units rest on the braces $F^6$ while the upper ends are secured to the upstanding end member $F^4$ and the intermediate upstanding frame member $F^3$. As will be observed from Fig. 1 the said top rail $F^5$ is connected to the frame member $B^2$ by an extensible coupling designated generally as $F^6$ and including an interiorly threaded socket member $F^7$ pivotally connected to the frame member $B^2$ and receiving a screw shaft $F^8$ having thereon a hand wheel for facilitating its manipulation. The upper end of the screw shaft $F^8$ is swiveled in a portion of the bracket $F^9$ pivotally carried by the top rail $F^5$. With this arrangement it will be apparent that by manipulating the hand wheel of the screw shaft $F^8$ the relative position of the upright frame F and the draw bar $B^1$ may be adjusted so as to permit the frame to assume a substantially vertical position, or a forwardly or backwardly leaning position as desired for the purpose of raising and lowering the forward end of the picking or gathering unit of the harvester designated in its entirety as G.

As previously indicated the present machine is equipped for handling two adjacent rows of corn, and to that end the gathering unit G preferably includes a pair of outside gathering plates 1 and 2 and an intermediate combined guiding toe and trough unit 3 for assisting in the picking and collecting of the ears of corn from the stalk. As will be observed from Fig. 1 the said outside gathering blades 1 and 2 are inclined toward the central unit 3 and are curved at their front ends as indicated at 4—4 thereby to cooperate with the curved portions 5—5 of the member 3 to provide converging mouth portions for receiving and delivering the corn stalks into the zone of operation of the gathering chains 6 which extend along the constricted throat portion formed between the plates 1 and 2 and the central member 3.

Before proceeding to a description of the operation and mounting of the chains 6 it may be noted from Fig. 2 that the said gathering unit G is inclined downwardly toward the front end of the harvester so that as the machine travels through the field the stripping or picking instrumentalities will remove the ears from the corn stalk even though the ears are arranged one above the other due to the fact that the highest portion of the unit G is designed and intended to move on a level with the highest ears on the stalks. Also, it may be noted that the central member 3 is provided with the oppositely inclined faces $3^a$ and $3^b$ respectively inclining toward the plates 1 and 2, while at the rear of the inclined portions $3^a$ and $3^b$ there is provided a trough like portion 7 whose sides incline downwardly to an elevating conveyor designated generally as 8 and forming the bottom of the trough 7. This conveyor serves to elevate the removed or picked ears of corn from the unit G to the chute G' which feeds a husking unit designated generally as H. The husking unit H removes the husks from the corn and deposits the husks on a waste conveyor K located beneath the husking unit, while the ears of corn with the husk removed are delivered into the lower collecting or receiving end L of a wagon loading conveyor unit M which includes a frame that is pivotally connected to the main frame F as indicated at N and also comprises the conveyor proper M'. The frame of the conveyor unit M' is disposed at a relatively low point at its receiving end and extends upwardly over the vehicle C to be loaded, and for the purpose of holding the same at the desired elevated angle a screw-threaded rod O and nut element O' may be utilized, the said rod being manipulated by a hand wheel O³ to raise and lower the conveyor on the pivot N which permits the conveyor to swing laterally as well as vertically. To control the lateral swinging of the conveyor M and properly position it over the vehicle C a suitable stay rod Q and angular adjusting lever Q' may be employed, the latter having a spring-pressed dog or pawl operating in connection with a segment or rack for holding the lever in the desired set position.

One of the distinctive features of the invention resides in driving all of the various operating instrumentalities of the harvester direct from the motor or engine E. Accordingly, by referring to the diagrammatic illustration of the units G, H and M shown in Fig. 4, as well as the full illustration thereof in Figs. 1, 2 and 3, it will be observed that the gathering chains 6 having the spaced offset teeth or spines 6ª are mounted on the main sprocket wheels 9 and 10 and trail over the idler rollers or wheels 11 which guide the inner flights of the chain in close parallel relation over the ribbed snapping or picking rolls 12—12. The sprocket wheels 9—9 located at the front end of the guiding mouths of the gathering unit are idler sprockets, but the rear sprockets 10 are mounted on stub shafts journaled in brackets 13 on the underframe of the plates 1 and 2 and have fitted thereto the beveled gears 14 which in turn mesh with the beveled gears 15 carried by shafts 16 which are equipped at their rear ends with gears 17 meshing with the gears 18 on shafts 19 which carry the snapping or stripping rolls 12. One of the shafts 19 in turn carries a gear 20 meshing with a gear 21 on the main power shaft 22.

As the gathering and picking instrumentalities at opposite sides of the gathering unit G are of duplicate construction or formation the description of one will suffice for the other and the same reference characters will apply in each instance. Both of the gathering and picking instrumentalities are operated by the main shaft 22 as will be readily apparent from Fig. 4.

The said main shaft 22 extends transversely of the machine and is journaled in suitable bearings provided for that purpose, and as will be noted from Fig. 4 the same is preferably provided with a universal joint 23 of the leather disk type for connecting the two sections of the main power thereby to relieve the shaft of any unusual bending stress or strain due to the application of power direct from the motor or engine E to the gear wheel 24 which meshes with the pinion 25 of the propeller unit designated generally as P. This propeller unit includes the shaft 26 which carries the gear 24 at one end and has a flexible joint 27 at its opposite end, one part of said joint being connected to one of the members 28 of a resilient and extensible coupling 29 which in turn is connected by a flexible joint 30 with the motor or engine E thereby to supply the main power shaft 22 with the desired motion without depending upon the movement of the harvester or other vehicle for the generation of power. As shown in Fig. 1 a suitable clutch device 31 operated by a clutch lever 32 may be utilized for connecting and disconnecting the propeller unit P with the engine E so as to permit the operator to cause the harvesting instrumentalities to operate or not as desired.

The elevating conveyor 8 of the gathering unit G includes the upper and lower sprocket shafts 8ª and 8ᵇ, the former carrying therewith a relatively large sprocket wheel 8ᶜ which receives a chain 33 that passes over the relatively small sprocket wheel 34 on the main power shaft 22. Thus, as the full ears of corn with the husk thereon are removed from the stalk and fall into the trough 7 and onto the conveyor 8, they are lifted by the latter and delivered into the upper end of the inclined trough G' which feeds the husking unit H.

The husking unit H preferably includes in its organization a plurality of husking rolls 35 and 36 adjacent ones of which are located in different planes so that all of the rolls as a unit are mounted in staggered relation in upper and lower parallel planes intersecting the axes of the upper rolls 35 and the lower rolls 36. As will be observed from Fig. 2 and also Fig. 4 the said rolls are geared to each other by gears 37 and the opposite ends of the rolls are journalled in the arms 38 pivoted as at 39 to the frame of the husking unit, while the end arms 38ª of the end rolls are pressed inwardly by springs 40 thereby to cause the peripheries of all of the rolls to yieldingly engage each other to grip and pull off the husks from the ear, and at the same time permit the rolls to yield or give sufficiently to enable the coarse pars of he shucks to pass between the rolls without jamming or otherwise injuring the entire unit. Also, the springs 40 serve to keep the gears 37 of the rolls in mesh and one of the pair of central rolls 36ª and 36ᵇ which have a stationary mounting in the husking frame, namely the roll 36ª is provided with a shaft carrying a gear 41 which meshes with a gear 42 on a shaft 43 which is driven from the main power shaft 22 by the bevel gear 44. Thus, the husking rolls 35 and 36 of the husking unit H are driven in opposite directions simultaneously by the power received from the main shaft 22, through the shaft 43 and gears 41—42. In the arrangement shown it will be understood that the central pair of rolls has a fixed mounting in the husking frame while the rolls at opposite sides thereof are mounted on the pivoted arms 38, and the latter in turn are pressed inwardly by the springs 40 thereby to keep the rolls in yielding contact and yet at the same time permit the same to be reliably driven from the main shaft due to the provision of the central fixed rollers.

As will be observed from Fig. 5 the central rolls $36^a$ and $36^b$ which have a fixed mounting in the husking frame contribute materially to the efficiency of the husking unit, largely due to the fact that because they rotate in opposite directions they cause the upper rolls 35 at each side of the center of the unit to rotate in the direction of the arrows which results in feeding the ears of corn to be husked from the sides of the unit toward the center, thereby avoiding congestion of the ears in the husking unit which would be the case if all of the upper rolls 35 operated in the same direction. In the latter case all of the ears of corn would have a tendency to shift to one side of the unit which would materially interfere with the efficiency of the husking rolls. With the arrangement described however, any tendency of the ears to collect or congest at the center of the husking unit is avoided under the pressure exerted by the conveyor 45 overlying the rolls, which conveyor will be presently described. In other words, the novel arrangement of the husking rolls shown in Figs. 2, 4, and 5 permits of better distribution of the ears over the whole surface of the rolls of the husking unit.

It will be seen that the husking rollers 35 and 36 are disposed transversely of the machine, and for the purpose of yieldingly forcing the ears bearing the husks into engagement with the husking rolls a flexible presser-conveyor 45 is mounted over the said rolls so that its lower flight will hold the ears of corn in contact with the husking rolls. The said flexible conveyor 45 carries therewith a plurality of transversely disposed slats or ribs 40 which materially assist in pressing the ears of corn into contact with the husking rollers. Also, it will be noted that the said conveyor 45 is mounted upon the sprocket shafts 47 and 48, the latter shaft carrying therewith a sprocket wheel 49 having a chain 50 passing thereover and in turn passing over a sprocket 51 on the shaft 43 previously referred to. In that way the presser-conveyor 45 is also operated by the main power shaft 22.

After the husks or shucks have been removed from the ears of corn it is proposed to remove the same toward the center of the harvester and to that end a waste conveyor K is mounted upon the sprocket shafts 52 and 53, the latter carrying a sprocket wheel 54 which is driven by a chain 55 passing over the sprocket 56 also on the shaft 43 driven from the main power shaft 22.

As shown in Fig. 3 the waste conveyor K moves in the direction of the arrow thereby to carry the shucks from the lower end of the husking unit toward the center of the machine where they may be dropped into a suitable receptacle or on the ground if desired.

When the ears of corn have been husked or shucked by the husking unit H, they are deposited, as previously explained in the receiving hopper L of the loading conveyor M whereupon they may be elevated and deposited in any desired part of the vehicle C according to the desire of the operator of the harvester who may control the position of the conveyor through the manipulating mediums O—$O^3$ and Q—$Q^1$.

The conveyor proper M' of the major loading conveyor M is operated by the sprocket wheels 58—59, the latter being driven by the sprocket 60 and chain 61, said chain 61 passing over a smaller sprocket 62 which is on one element of a clutch device on the end of the main power shaft 22. This clutch device is adapted to be controlled in the conventional manner by shifting clutch collar 63 and the manipulating lever 64 (Fig. 1). The purpose of having the conveyor M' under the control of the operator is to enable the proper distribution of the ears of corn in the vehicle C, according to the speed that the ears are shucked and delivered to the hopper L for placing in the trailing vehicle, and to otherwise render the loading independent of the picking and shucking units.

From the foregoing description it will be apparent that the present harvester includes in its organization a novel gathering unit G comprising gathering chains and stripping rollers disposed parallel to the line of travel of the machine and adapted to snap or pick the ears of corn from the stalk and deliver the same into the trough which feeds the elevator 8. The conveyor 8 then delivers the full ears of corn to the chute G' which feeds the husking unit H and the latter strips the shuck or husks from the ears and delivers the same to the hopper L for transfer into the waiting vehicle. One of the distinctive features of the machine is the provision of the main power shaft 22 which is disposed transversely of the harvester frame and is driven direct from the motor of the tractor thereby to supply all of the operating parts of the harvester with the necessary power to perform the intended functions of each unit. Also, the manner of raising and lowering the gathering unit to strip the ears of corn from the stalk is important since it enables maximum stripping efficiency under varying conditions of use.

Without further description it is thought that the many features and advantages of the present invention will be readily apparent to those skilled in the art, and it will of course be understood that changes in the form, proportion and minor details of construction may be resorted to, without departing from the spirit of the invention and scope of the appended claims.

I claim:—

1. In a harvesting machine, a wheeled frame comprising structural metal members arranged to provide a rigidly braced carrying frame, a gathering and picking unit mounted at one end of the said frame, said unit having spaced curved diverging guiding shoes and correspondingly curved gathering chains at the forward end thereof, a draw-bar hinged to the other end of said frame, and an obliquely disposed beam connected with the draw-bar and hinged to the main frame, said beam and bar being located at the end of the frame opposite the gathering unit, a platform provided on the beam and draw-bar, and means connecting the draw-bar and beam with the main frame to adjust one with reference to the other and thereby position the gathering and picking unit.

2. In a harvesting machine, a wheeled frame comprising structural metal members arranged to provide a rigidly braced carrying frame, a gathering and picking unit mounted at one end of said frame, said unit having spaced curved diverging guiding shoes and correspondingly curved gathering chains at the forward end thereof, a draw-bar hinged to the other end of said frame, and an obliquely disposed beam connected with the draw-bar and hinged to the main frame forming a triangular shaped platform at the end of the frame opposite the gathering unit, and a screw mechanism pivoted at its opposite ends between the draw-bar and beam, and the main frame, for adjusting the gathering and picking unit with respect to the main frame.

3. A harvesting machine comprising a wheeled main frame consisting of spaced angle members, upstanding end and intermediate frame members having their lower ends secured to said angle members, and a top rail rigidly connecting the upper portions of said end and intermediate upstanding frame members and thereby extending entirely across the harvester frame to provide a rigidly braced main frame, braces carried by the said angle members and extending forwardly therefrom, and gathering and picking units connected to said braces and to the intermediate upstanding frame member and one of the upstanding end frame members.

4. A harvesting machine comprising a main frame consisting of spaced angle members arranged with their included angles facing each other, upstanding end and intermediate frame members secured in the included angles of said angle members, a top rail of angular cross section coextensive with the length of said angle members and connecting the tops of all of said upstanding frame members, braces carried by the underside of said angle members and projecting forwardly thereof, and gathering and picking units supported respectively by said braces and by one of the upstanding end frame members and the upstanding intermediate frame member.

5. In a corn harvester of the class described, a unitary transverse main frame having ground wheels mounted on the ends thereof, two pairs of snapping rolls mounted on the front end of the frame at one side thereof, and a forwardly extending hitch mounted on the other front side of said frame by means of two widely spaced pivots, adjustable means connecting said frame and said hitch, whereby the operator can move the front or receiving ends of said rolls up and down, elevating means for the ears located between said pairs of rolls, whereby the ears will be carried in rear of said frame, a transversely positioned husking device mounted to the rear of said frame, paralleling the same and positioned in rear of said hitch, a chute for transferring the ears from said elevator to said husking unit, and a final elevator detachably positioned at the outlet end of said husking unit whereby the husked corn can be elevated to a final receptacle.

6. A tractor drawn corn harvester including a transverse main frame having supporting and travelling wheels mounted at the ends thereof, snapping roll units mounted on the frame at one side thereof adjacent one of the supporting wheels, a forwardly extending hitch mounted on the other side of the frame and pivotally connected therewith, said snapping roll units and hitch being mounted on the frame between said wheels, means between the hitch and the frame for varying the vertical position of the frame and in turn raising and lowering the snapping units carried by said frame, elevating means for the snapping units extending from the front of said frame to the rear thereof, a husking unit supported parallel with the transverse frame and adapted to receive discharge from said elevating means, and a final elevator having its lower end arranged in receiving relation to the discharge end of the husking unit, said final elevator being located at the side of the frame, to which the hitch is attached.

7. A corn harvester adapted to be tractor drawn comprising, in combination, a transverse main frame, supporting wheels at the ends of said frame, snapping roll units mounted on said frame between said supporting wheels and adjacent to one of the latter and extending forwardly from said frame, a forwardly extending hitch pivotally connected with said frame between said supporting wheels and adjacent to the other of said wheels, means between the hitch and the frame for varying the vertical position of the frame to in turn raise and lower the snapping units carried by said frame, a forwardly and rearwardly extending conveyor at the first mentioned end of the transverse frame cooperating with the snapping units to elevate the ears of corn gathered by said snapping units, a final conveyor disposed rearwardly of said transverse frame at the second mentioned end thereof, and a husking unit extending between said conveyors and having one end disposed in receiving relation to the discharge end portion of said snapping roll conveyor and its other end disposed in discharging relation to the receiving end portion of said final conveyor.

In testimony whereof I hereunto affix my signature.

JOHN POWELL.